(12) United States Patent
Vosshenrich et al.

(10) Patent No.: US 11,126,958 B2
(45) Date of Patent: Sep. 21, 2021

(54) SYSTEM AND METHOD FOR PICKING AND PURCHASING GOODS

(71) Applicant: neoalto GmbH, Cologne (DE)

(72) Inventors: Udo Vosshenrich, Bad Salzuflen (DE); Oliver Vosshenrich, Bad Salzuflen (DE)

(73) Assignee: neoalto GmbH, Cologne (DE)

( * ) Notice: Subject to any disclaimer, the term of this patent is extended or adjusted under 35 U.S.C. 154(b) by 70 days.

(21) Appl. No.: 16/488,635

(22) PCT Filed: Feb. 20, 2018

(86) PCT No.: PCT/EP2018/054151
§ 371 (c)(1),
(2) Date: Aug. 26, 2019

(87) PCT Pub. No.: WO2018/153860
PCT Pub. Date: Aug. 30, 2018

(65) Prior Publication Data
US 2019/0385116 A1  Dec. 19, 2019

(30) Foreign Application Priority Data

Feb. 27, 2017 (DE) .................... 10 2017 104 038.2

(51) Int. Cl.
*G06Q 10/08* (2012.01)
*G06Q 20/20* (2012.01)
*G06Q 20/32* (2012.01)
(Continued)

(52) U.S. Cl.
CPC ......... *G06Q 10/087* (2013.01); *G06Q 20/208* (2013.01); *G06Q 20/325* (2013.01); *G06Q 30/0639* (2013.01); *H04W 4/35* (2018.02)

(58) Field of Classification Search
CPC ............... G06Q 10/087; G06Q 20/208; G06Q 20/326
See application file for complete search history.

(56) References Cited

U.S. PATENT DOCUMENTS

| 8,832,319 B2 | 9/2014 | Kessel et al. |
| 10,268,983 B2 | 4/2019 | Kumar et al. |
| (Continued) | | |

FOREIGN PATENT DOCUMENTS

| CH | 611443 A5 | 5/1979 |
| DE | 112013001770 T5 | 1/2015 |
| (Continued) | | |

OTHER PUBLICATIONS

International Search Report of PCT/EP2018/054151 dated May 30, 2018.

(Continued)

*Primary Examiner* — A. Hunter Wilder
(74) *Attorney, Agent, or Firm* — Collard & Roe, P.C.

(57) ABSTRACT

A system for picking and purchasing goods includes a purchasing area having a plurality of different goods stored in units of the same goods category, at least one mobile terminal, a locating device by means of which the position of the mobile terminal or of a person wearing the mobile terminal can be detected and at least one device for recording the number of goods in a unit with goods of the same goods category, and a method for picking and purchasing goods.

12 Claims, 1 Drawing Sheet

(51) Int. Cl.
*G06Q 30/06* (2012.01)
*H04W 4/35* (2018.01)

(56) References Cited

U.S. PATENT DOCUMENTS

| | | | |
|---|---|---|---|
| 10,692,312 B1 * | 6/2020 | Niranjayan | G07C 9/25 |
| 2005/0243784 A1 | 11/2005 | Fitzgerald et al. | |
| 2013/0225197 A1 | 8/2013 | McGregor et al. | |
| 2013/0256395 A1 | 10/2013 | Barkan et al. | |
| 2015/0019391 A1 * | 1/2015 | Kumar | G06Q 10/087 |
| | | | 705/28 |
| 2015/0021396 A1 * | 1/2015 | Nunnink | G06K 7/10732 |
| | | | 235/455 |
| 2016/0042440 A1 * | 2/2016 | Francis | G06Q 30/0639 |
| | | | 705/26.81 |
| 2016/0188840 A1 | 6/2016 | Eramian | |
| 2016/0283898 A1 | 9/2016 | Rether et al. | |
| 2016/0323754 A1 | 11/2016 | Friday et al. | |

FOREIGN PATENT DOCUMENTS

| | | |
|---|---|---|
| DE | 102013222263 A1 | 4/2015 |
| DE | 202016102200 U1 | 5/2016 |
| DE | 202016105648 U1 | 1/2018 |
| EP | 2631665 A2 | 8/2013 |
| GB | 1557196 | 12/1979 |
| WO | 2014209724 A1 | 12/2014 |
| WO | 2016180974 A1 | 11/2016 |

OTHER PUBLICATIONS

German Search Report dated Jan. 26, 2018 (with English translation of relevant parts).
Amazon Go—Supermarkt ganz ohne Kasse; Golem.de; Dec. 6, 2016; URL: https://www.golem.de/news/amazon-go-supermarkt-ganz-ohne-kasse-1612-124899.html, downloaded on Jan. 26, 2018 (with English translation).
Amazon just launched a cashier-free convenience store. The Verge; Dec. 5, 2016; URL: https:www.theverge.com/2016/12/5/13842592/amazon-go-new-chashier-less-convenience-store, downloaded on Jan. 26, 2018.
Supermarkt der Zukunft. Zeit Online; Dec. 6, 2016; URL: http://www.zeit/de/wirtschaft/unternehmen/2016-12/amazon-go-supermarkt-lebensmittel-service-einkaufen-datenschutz-zukunft , downloaded on Jan. 26, 2018 (with English translation).

* cited by examiner

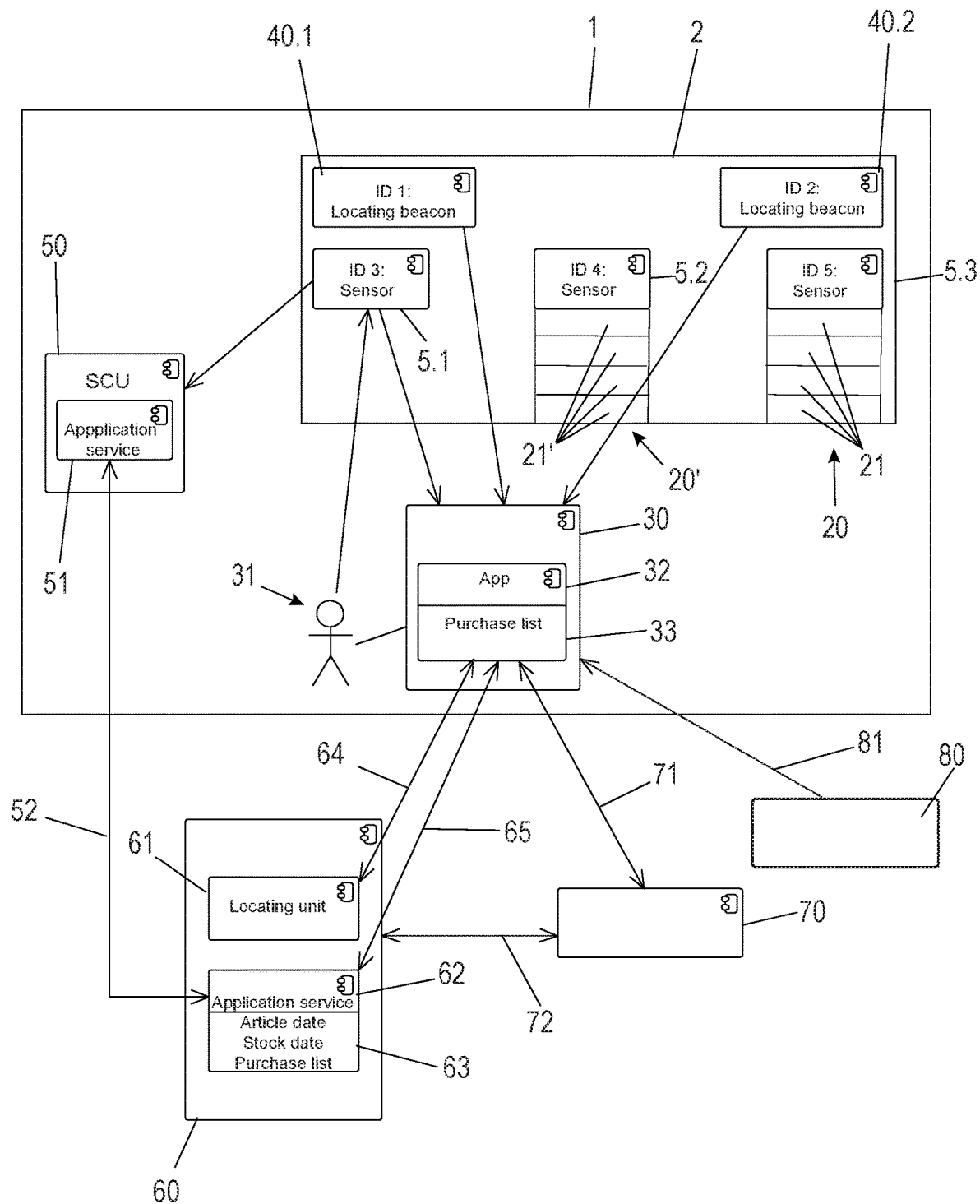

SYSTEM AND METHOD FOR PICKING AND PURCHASING GOODS

CROSS REFERENCE TO RELATED APPLICATIONS

This application is the National Stage of PCT/EP2018/054151 filed on Feb. 20, 2018, which claims priority under 35 U.S.C. § 119 of German Application No. 10 2017 104 038.2 filed on Feb. 27, 2017, the disclosures of which are incorporated by reference. The international application under PCT article 21(2) was not published in English.

BACKGROUND OF THE INVENTION

The present invention relates to a system for picking and purchasing goods, comprising a purchasing area having a plurality of different goods stored in units of the same goods category, at least one mobile terminal, a locating device by means of which the position of the mobile terminal or of a person wearing the mobile terminal can be detected and at least one device for recording the number of goods in a unit with goods of the same goods category, and a method for picking and purchasing goods.

WO 2014/209724 A1 describes a computer-aided system for purchasing goods in which image recognition is used to record when a buyer has grabbed goods. In this way, the purchasing transaction can be entered and assigned to the purchaser, who then has to pay for the goods picked. However, an optical detection of the goods and the assignment of the seized goods to a certain person have disadvantages, since the accuracy of such an optical detection is limited.

SUMMARY OF THE INVENTION

It is therefore the object of the present invention to create a system and method for picking and purchasing goods that is simple in design and has a low susceptibility to error.

This object is solved using a system with the features of claim 1 and a method with the features of claim 9.

With the system for picking and purchasing goods according to the invention, the position of the mobile terminal, which is arranged with the smallest distance when removing goods, can be determined via a locating device. When a signal concerning the withdrawal of goods is received, the device for recording the quantity or number of goods in a unit with goods of the same goods category can communicate directly or indirectly with a controller which mobile terminal is closest to the unit with the withdrawn goods. Using a communication unit, a data signal about the removal of the goods can then be transmitted to the mobile terminal so that the mobile terminal is immediately informed about the removal of the goods after the removal of the goods and can inform the order picker or purchaser (hereinafter referred to as "user") of the removal of the goods. This eliminates the need for a user's hand to be optically captured, as the withdrawal of goods is immediately captured by an appropriate device and can then be assigned via the locating device. Using the communication with the controller, both the goods withdrawal and further information about the goods, such as the price and, if necessary, further goods information can then be displayed on the mobile terminal.

The data communication with the mobile terminal from the device for recording the number of goods or the locating device can be carried out via wireless communication, for example WLAN, Bluetooth™ Low Energy (BLE), Near Field Communication (NFC), acoustic signals or modulated optical signals.

Preferably, the locating device comprises a plurality of beacons, each of which sends a signal to the mobile terminal, and the strength of which allows the position of the mobile terminal in the warehouse to be determined. The goods can be arranged in a goods carrier, such as a sales shelf, wherein at least two beacons are provided per goods carrier, preferably more than four beacons are arranged in the goods area in order to be able to detect the position of the mobile terminals in the goods area. The beacons can be arranged both horizontally at different positions and vertically at different positions in order to be able to determine an exact position, for example, when a user lowers to pick a product from a lower area of a goods carrier.

In a further embodiment, the mobile terminal has a communication unit communicating with the controller and a display device which can be used to display information on the goods removed. Communication with the controller can also take place via wireless transmission technologies such as WLAN, NFC, BLE or via the Internet. Optionally, the controller can be located either in the goods area or at a completely different location away from the goods area.

In a preferred embodiment, the at least one device for recording the number of goods in a group of goods of the same goods category shall comprise a transmitter by means of which at least data on the goods category or identity information can be transmitted to the transmitter. Using this transmitted data, the mobile terminal and/or the controller can assign the withdrawn goods to a goods category. This enables the goods category to be determined at short notice after the goods have been removed in order to display a price or further information on the goods on the mobile terminal.

At least one device for recording the number of goods in a unit of the same goods category preferably comprises a mechanical, electronic or gravitational conveyor device which, when removing a good, transports the remaining goods in the unit of the same goods category to the front of the goods carrier. In a special design, this conveyor can consist of a pusher for the goods which is pretensioned by a force accumulator and thus pretensions goods to a stop at which they can be removed. In addition, an energy storage device can be provided for the power supply in order to enable a corresponding signal to be emitted when the pusher is moving. When the pusher is at a standstill, it is preferable not to send a signal, so that the device can be operated with low power consumption. An example of such a device for recording the stock of goods of a certain goods category is described in DE 20 2016 105 648.

Preferably, a unit for stock recording is provided, by means of which it is possible to record how many goods of one goods category are in stock in the goods area. For this purpose, the inventory recording unit shall preferably communicate with all devices for recording the number of goods in a unit of the same goods category and shall also have a communication unit which can be connected to an external controller, for example to trigger a repeat order because the stock of individual goods is too low. This inventory recording unit is preferably located in the goods area and can communicate wirelessly with the individual devices for recording the number of goods.

In the method according to the invention, a mobile terminal is first introduced into a goods area and then a product is removed by a person wearing the mobile terminal. The mobile terminal is located during the withdrawal of goods, wherein a locating device is used to determine which mobile terminal is closest to the withdrawn goods in the goods area. The quantity or number of goods removed and the goods category can then be determined, for example using a position sensor for a pusher or a weight sensor at a goods receiving point, to transmit the data on the number of goods removed and the goods category to a controller. Furthermore, the data on the number of goods removed and the goods category is processed by the controller and assigned to the terminal device that was closest to the place where the goods were removed. Data on the goods removed can then be transferred to this mobile terminal by the controller.

The controller preferably has a memory in which all product types and assigned price information are stored, optionally also further information on the goods, and after the goods have been removed at least the price information can be sent to the mobile terminal. This allows a virtual shopping list to be generated on the mobile terminal.

The removal of the goods and transfer of the data to the mobile terminal and the controller can be repeated as often as necessary until the completion of the picking or purchasing process. For this purpose, the user of the mobile terminal can then trigger closing activities, such as confirming the virtual shopping list, creating picking and delivery documents or a payment transaction and removing the withdrawn goods from the goods area.

BRIEF DESCRIPTION OF THE DRAWING FIGURES

FIG. 1 shows a schematic view of a system according to the invention for picking and purchasing goods.

DETAILED DESCRIPTION OF THE INVENTION

A system for picking and purchasing goods comprises a goods area 2 in room 1, wherein room 1 can be located in a building, tent or hall. Goods area 2 comprises a large number of different goods 21, 21' which are stored in units of 20, 20' of the same goods category. Goods 21, 21' and units 20, 20' may, for example, be arranged in a goods carrier in which the individual goods 21, 21' are arranged side by side and one above the other, and the goods of the same goods category are arranged one behind the other. The units 20, 20' with goods 21, 21' can also be provided in containers, tubs, cartons or other equipment instead of in a goods carrier. In the goods area 2, any number of different goods 21, 21', can be provided, depending on the size of the goods area 2.

In order to pick or purchase goods 21, 21', a user 31 must have a mobile terminal 30, such as a mobile phone, tablet PC or other portable computer. The mobile terminal 30 is equipped with special software 32, which enables data exchange in goods area 2. Furthermore, the mobile terminal 30 includes a display unit 33 on which removed goods 21, 21' can be displayed.

The mobile terminal 30 can communicate with a controller 60 via a communication unit, for example via the Internet or another wireless communication such as WLAN, NFC, BLE. The controller 60 can also communicate with other data processing systems. In a special embodiment, controller 60 communicates with payment unit 70, as shown by arrow 72. Payment can be processed via known means of payment such as credit card, EC card, Paypal or other payment service providers.

Goods areas 2 contains devices 5.1, 5.2 and 5.3 (sensor beacons) for recording the number of goods in a unit 20, 20' with goods 21, 21' of the same goods category. Thus, through device 5.3 the number of goods 21 can be recorded in unit 20, while through device 5.2 the number of goods 21' can be recorded in unit 20'. Each unit 20, 20' with goods 21, 21' of the same goods category is thus assigned a device 5.1, 5.2, 5.3 to record the number of goods in stock. Each device 5.1, 5.2, 5.3 includes an identification number or data identifying the goods of the assigned goods category. The devices 5.1, 5.2 and 5.3 or sensor beacons can also preferably measure other environmental data, such as temperature, brightness, humidity, etc., and transmit them via the local controller 50 to the central controller 60.

In goods area 2, locating devices 40.1 and 40.2 are also provided, which are formed, for example, by locating beacons. Locating devices 40.1 and 40.2 allow signals to be sent to mobile terminal 30, and depending on the strength of the signals detected on the mobile terminal 30, the position of the mobile terminal 30 relative to locating devices 40.1 and 40.2 can be detected. The number of locating devices in goods area 2 can be selected depending on the size of goods area 2, wherein at least two locating devices are provided per goods carrier. In addition, the locating devices can also be arranged at different heights so that different vertical positions of the carrier of the mobile terminal 30 can also be detected.

The device (sensor beacons) for recording the number of goods 21, 21' in a unit 20, 20' of the same goods category is also connected via a communication device to a local controller 50 or unit, in particular wirelessly via WLAN, BLE, NFC or other data transmission devices. The unit 50 includes control software 51, which can send the data of the sensor beacons to a stock module 62 of the controller 60, as symbolized by the arrow 52. The stock module 62 can trigger further rule-based activities (e.g. ordering goods when the stock level falls below a minimum level, triggering an alarm in the event of unusual withdrawals, etc.). The unit 50 thus forms a local data collection and transmission unit (SCU) which is positioned in the transmission range of the sensor beacons 5.1, 5.2 and 5.3. For large spatial system installations it may be necessary to position several SCUs in goods area 2 so that area-wide reception of the sensor beacon signals is guaranteed.

For picking or shopping, a user 31 first enters a goods area 2 with a mobile terminal 30. In this goods area 2, the position of the mobile terminal 30 and thus of the user 31 can be determined via the locating device 40.1 and 40.2. The locating devices 40.1 and 40.2 (locating beacons) send data packets periodically at intervals of at least Tp=100 ms, in particular with the following content:

Identifier/ID of the locating beacon for unique identification of the transmitting beacon Radio transmission power P_TX in dBm for calculating the radio channel attenuation from the transmitting locating beacon to the receiving mobile terminal for determining the distance between transmitter and receiver Device identifier for distinguishing different types of beacon such as locating beacon or sensor beacon The user 31 now removes a good 21, and by removing the good 21, the remaining goods 21 of the same product type are also moved by a conveying device, which is detected by the device 5.3 for recording the number of goods 21, which then sends a signal to the SCU 50 and all mobile terminals 30 within range, informing them that the good 21 of a specific goods category has been removed. Alternatively, only the identification number of the device 5.3 can be transmitted, and the assignment to a particular good will be made later.

Almost simultaneously with the removal of a good 21 and the signal triggered thereby from the sensor beacons, the mobile terminal 30 receives at least one data packet each from the locating devices 40.1 and 40.2. These data packets are sent by the application 32 on the mobile terminal 30 via the communication channel 64 to a locating unit 61 of the controller 60. The locating unit 61 now uses the data packets transmitted by the terminal devices 30 to determine which mobile terminal has been closest to the locating devices 40.1 and 40.2. The mobile terminal 30, which was closest to the locating devices 40.1 and 40.2, is assigned the removed goods by the locating unit 61 via the communication channel 64, and on this mobile terminal 30 it is consequently indicated that a product has been removed.

The data packet of a sensor beacon of the devices 5.1, 5.2 and 5.3 contains in particular the following information:
- Identification/ID of the sensor beacon for unique identification of the transmitting beacon
- Radio transmission power P_TX in dBm for calculating the radio channel attenuation from the transmitting sensor beacon to the receiving mobile terminal to determine the distance between transmitter and receiver.
- Device identifier for distinguishing different types of beacon such as locating beacon or sensor beacon
- Measured value of the stock sensor
- Event identifier, in particular for indicating whether goods have been removed or returned at the product location For technical diagnosis, further telemetry data can be provided as content of the data packet, such as system uptime, number of sent data packets, temperature at product location, data for power supply, etc.

The controller 60 comprises a memory in which the data of the sensor beacons 5.1, 5.2 and 5.3 are assigned to specific goods. By receiving the identification of a sensor beacon, the controller 60 can thus determine which goods the user has removed. Controller 60 also includes a memory in which information on the removed good 21 is stored, in particular price information, and optionally also further information, for example on the ingredients and suitability of the goods for certain groups of people. This data for the removed good 21 can now be transmitted from the controller 60 to the mobile terminal 30 so that the mobile terminal 30 has both the information for the removed good 21 and the price information. This allows a comprehensive virtual picking or purchasing list to be generated. The necessary data transmissions are shown schematically with arrows 64 and 65.

User 31 can repeat this procedure as often as necessary until all goods 21, 21' to be picked or purchased have been removed. Then the user 31 can go to an exit with his mobile terminal 30 and trigger further actions, e.g. the payment process, optionally at the push of a button in the mobile terminal 30 or just by passing a checkout beacon 80, which automatically transmits the completion of the shopping process to the mobile terminal 30 and thus triggers the automatic cashless payment process. For this purpose, several checkout beacons 80 are preferably provided at the exit of the goods area, which have a reduced transmission power with a radio range of only 1 m to 2m. The checkout beacons 80 are positioned so that they can only be received by the user's mobile terminal 30 when leaving goods area 2, as shown by arrow 81, and then automatically end the picking or purchasing process.

In the embodiment example shown, the local controller (SCU) 50 and the controller 60 are arranged separately, wherein it is of course possible to combine the local controller 50 and the controller 60 into one unit.

A device for presenting goods and for recording the number of goods in a particular goods compartment may, for example, be designed as described in utility model DE 20 2016 105 648. Instead of this device for the presentation of goods with optical sensors, other devices with other conveying devices and other sensors can also be used to measure the filling level at a compartment. For example, the inventory determination unit can have a distance measurement, a weight measurement or an optical recognition.

LIST OF REFERENCE NUMERALS

1 Room
2 Goods area
3 Compartment
4 Goods pusher
5 Sensor
5.1, 5.2, 5.3 Device
20, 20' Unit
21, 21' Goods
30 Mobile terminal
31 User
32 Purchasing software
33 Display unit
40.1, 40.2 Locating device
50 Unit
51 Control software
52 Arrow
53 Device
60 Controller
61 Locating unit
62 Stock module
64 Arrow
65 Arrow
70 Payment unit
71 Arrow
72 Arrow
80 Checkout beacon
81 Arrow

What is claimed is:

1. A system for picking and purchasing goods (21), comprising:
   a) a goods area (2) having a plurality of different products (21) stored in units (20) of the same goods category;
   b) at least one mobile terminal (30);
   c) locating devices (40.1, 40.2) by means of which the position of the mobile terminal (30) can be detected;
   d) at least one device (5.1, 5.2, 5.3) configured for recording the number or quantity of goods (21) in a unit (20) with goods (21) of the same goods category, wherein each device (5.1, 5.2, 5.3) is in the form of a sensor and is assigned to a separate unit (20),
   e) at least one device (50) configured for collecting and transmitting data from the device (5.1, 5.2, 5.3) for recording the number or quantity of goods to a controller (60);
   wherein the system is configured such that a signal of a withdrawal of goods from one of the devices (5, 1, 5, 2, 5.3) for recording the number or quantity of goods (21) in a unit (20) with goods (21) of the same goods category causes the at least one mobile terminal (30) to receive data from each of the locating devices and send the data to the controller 60, wherein the controller (60)

uses the data sent from the mobile terminal (30) to determines which mobile terminal (30) is closest to this unit (20) with goods (21) of the same goods category, and transmits to the mobile terminal (30) that is closest to the unit with goods (21) of the same category by means of a communication unit a data signal about the withdrawal of the goods (21) so that information about the withdrawal of the goods is communicated without a user's hand being optically captured, as the withdrawal of the goods is immediately captured by one of the devices for recording the number or quantity of goods and can then be assigned via the locating device.

2. The system according to claim 1, wherein the locating device (40.1, 40.2) comprises a plurality of transmitters which send a signal to the mobile terminal (30) and the position of the mobile terminal (30) in the goods area (2) can be determined on the basis of the strength of the signals from the transmitters.

3. The system according to claim 1, wherein the mobile terminal (3) has a communication unit communicating with the controller (60) and a display unit by means of which information about the removed goods (21) can be displayed.

4. The system according to claim 1, wherein the at least one device (5.1, 5.2, 5.3) for recording the number or quantity of goods in a unit (20) of the same goods category comprises a transmitter (12) by means of which at least data relating to the goods category of the removed goods (21) can be transmitted to the mobile terminal (30) and/or the controller (60).

5. The system according to claim 1, wherein the at least one device (5.1, 5.2, 5.3) for recording the number or quantity of goods (21) in a unit (20) of the same goods category has a goods pusher (4) pretensioned by a force accumulator.

6. The system according to claim 1, wherein the at least one device (5.1, 5.2, 5.3) for recording the number of goods (21) in a unit (20) of the same goods category has an energy storage device for power supply.

7. The system according to claim 1, wherein the device (50) configured for collecting and transmitting data comprises a unit for data buffering and transmission.

8. The system according to claim 1, wherein the controller (6) comprises a unit (60) for stock determination that is configured to ascertain how many goods (21) of a goods category are in stock in the goods area.

9. A method for picking and purchasing goods (21) comprising the following steps:
   a) introducing a mobile terminal (30) into a goods area (2) with a plurality of different products (21) stored in units (20) of the same goods category;
   b) removal of goods (21) by a person (31) carrying the mobile terminal (30);
   c) locating the mobile terminal (30) which is closest to the removed goods (21) by a locating device (40.1, 40.2) sending data to the mobile terminal and then the mobile terminal (30) sending the data to and evaluation by a locating unit of a controller (60);
   d) recording the change in position or weight resulting from the removal of the goods (21) by a device (5.1, 5.2, 5.3) in the form of a sensor for recording the number or quantity of goods (21) with one device (5.1, 5.2, 5.3) assigned to each one of the units (20);
   e) transmitting the data of the device (5.1, 5.2, 5.3) for recording the number or quantity of goods (21) to the controller (60), and
   f) determining the number or quantity of goods (21) removed by evaluating the data from the device (5.1, 5.2, 5.3) to record the quantity of goods (21) and the goods category via the controller (60), and
   g) communicating via a communication unit of the controller (60) the number or quantity of goods (21) removed to the mobile terminal (30) which is closest to the removed goods;
   wherein the steps of locating, recording, transmitting, determining and communicating are triggered by a signal from the device for recording the number or quantity of goods upon removal of the goods, and wherein information about the removal of the goods is communicated without a user's hand being optically captured, as the removal of the goods is immediately captured by one of the devices for recording the number or quantity of goods and can then be assigned via the locating device.

10. The method according to claim 9, wherein in step d) the device (5.1, 5.2, 5.3) for recording the number of goods (21) detects a change in position of a goods pusher (4).

11. The method according to claim 9, wherein the controller (60) has a memory in which all goods categories and associated price information are stored, which is sent to the mobile terminal (30) after the goods (21) have been removed.

12. The method according to claim 9, wherein steps b) to f) are repeated and, in order to complete the picking or purchasing process, a completion process, in particular a payment process, is triggered via the mobile terminal (30).

\* \* \* \* \*